(12) United States Patent
Teague

(10) Patent No.: US 6,223,105 B1
(45) Date of Patent: Apr. 24, 2001

(54) SYSTEM FOR DETERMINING THE ORIENTATION IN SPACE OF A MOVING BODY RELATIVE TO THE EARTH

(75) Inventor: E. Harrison Teague, Menlo Park, CA (US)

(73) Assignee: Seagull Technology, Inc., Los Gatos, CA (US)

( * ) Notice: Subject to any disclaimer, the term of this patent is extended or adjusted under 35 U.S.C. 154(b) by 0 days.

(21) Appl. No.: 09/418,966

(22) Filed: Oct. 14, 1999

(51) Int. Cl.$^7$ ................ G06F 7/00; G06F 17/00
(52) U.S. Cl. ................ 701/13; 701/4; 701/215; 244/155; 244/171; 244/164; 342/62
(58) Field of Search ................ 701/13, 4, 215, 701/213, 226, 200, 214; 244/158 R, 164, 171; 342/62, 357.11; 73/178 R

(56) References Cited

U.S. PATENT DOCUMENTS

| | | | |
|---|---|---|---|
| 4,930,085 | 5/1990 | Kleinschmidt | 364/449 |
| 5,101,356 | 3/1992 | Timothy et al. | 364/448 |
| 5,406,489 | 4/1995 | Timothy et al. | 364/434 |
| 5,856,802 * | 1/1999 | Ura et al. | 342/357.08 |
| 5,884,214 * | 3/1999 | Krasner | 701/207 |
| 5,944,770 * | 8/1999 | Enge et al. | 701/207 |
| 5,974,359 * | 10/1999 | Ohkubo | 701/214 |
| 5,999,880 * | 12/1999 | Okada et al. | 701/213 |
| 5,999,890 * | 12/1999 | Kihara | 702/142 |
| 6,064,336 * | 5/2000 | Krasner | 342/357.02 |

OTHER PUBLICATIONS

Roger Hayward, et al., "Two Antenna GPS Attitude and Integer Ambiguity Resolution for Aircraft Applications", pp. 1–6, Stanford University, CA. Jan. 1999.

* cited by examiner

*Primary Examiner*—William A. Cuchlinski, Jr.
*Assistant Examiner*—Olga Hernandez
(74) *Attorney, Agent, or Firm*—Thomas E. Schatzel; Law Offices of Thomas E. Schatzel, a Prof. Corp.

(57) ABSTRACT

Navigation satellite receiver measurements of the acceleration of a moving vehicle are used to derive valuable attitude information about the vehicle. Three-dimensional accelerometer measurements aboard the vehicle are used to determine the specific force vector in the bow frame. The navigation satellite receiver measurements allow determination of the specific force vector in the earth-fixed frame. The specific force vector measured in both vehicle and earth-fixed frames can be used with additional information to derive vehicle attitude.

13 Claims, 2 Drawing Sheets

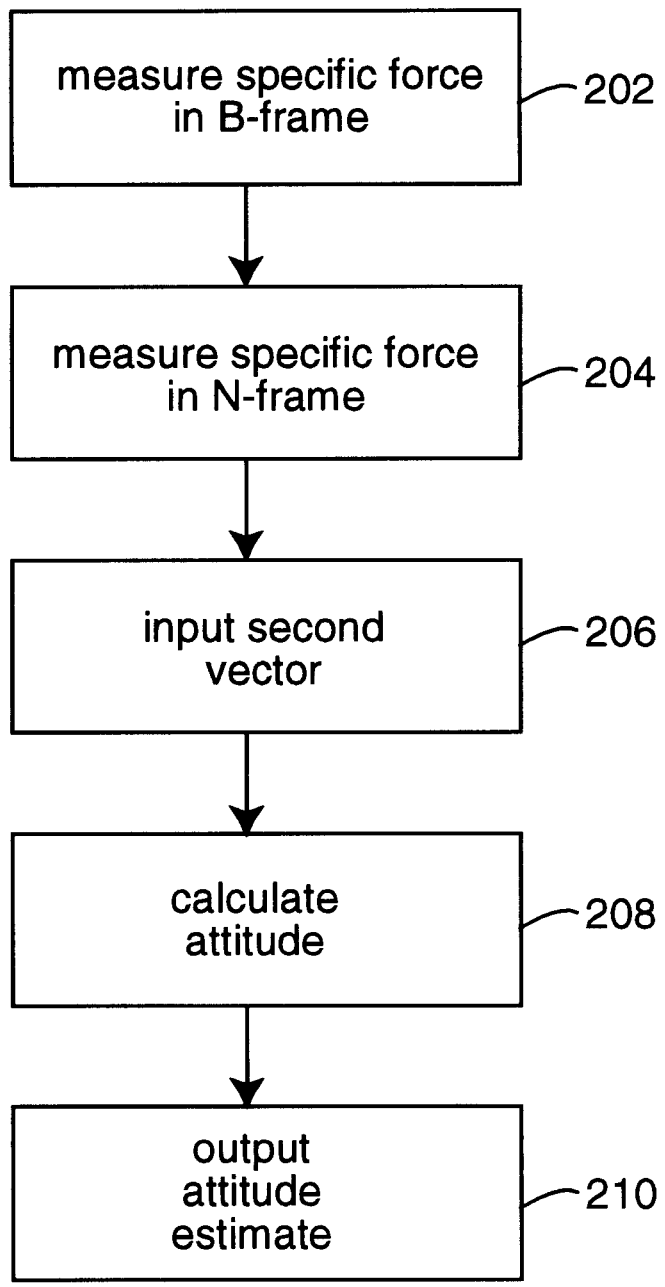

Figure 1:
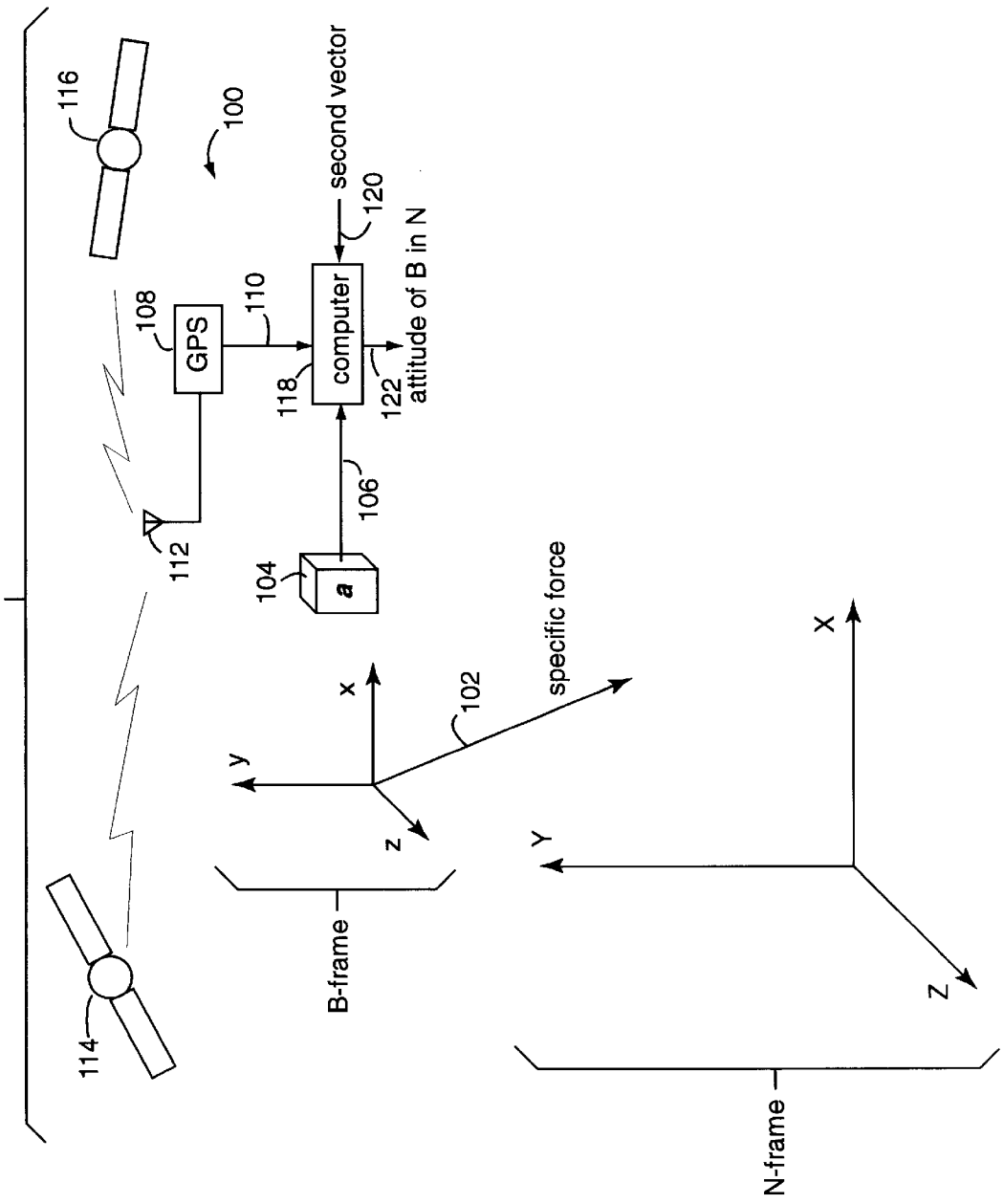

SYSTEM FOR DETERMINING THE ORIENTATION IN SPACE OF A MOVING BODY RELATIVE TO THE EARTH

1. FIELD OF THE INVENTION

The present invention relates to navigation and attitude determination systems, and more particularly to the determination of the attitude of a moving body relative to the earth where the solution includes knowledge of the specific force of a point on the moving body.

2. DESCRIPTION OF THE PRIOR ART

The attitude of a moving body through space can be described by the three components of heading, pitch, and roll. In an airplane, the heading is the compass direction, the pitch is a measure of how far the nose is up or down, and the roll relates the angle of the wings to the horizon.

Bubble levels allow for a very crude measurement of the pitch and roll of a moving vehicle. But if the vehicle is turning or accelerating, then the vehicle's acceleration will disturb the bubble level. Magnetic compasses allow for heading determinations, but these too suffer from gross inaccuracies, and many common items and activities can disturb a compass measurement too.

The prior art includes the measurement of two or more vectors in each of two frames to determine the attitude between the frames. For example, star trackers that are common in orbiting satellites allow the taking of two vectors in the vehicle frame, e.g., to each of two different particular stars. The knowledge of earth-frame vectors to these same two stars allows for the solution of the attitude of the vehicle frame relative to the earth frame.

LaMar Timothy, et al., in U.S. Pat. No. 5,406,489, issued Apr. 11, 1995, describes the determination of the attitude of a moving aircraft from a measurement of the specific force in two frames. Three accelerometers, a global positioning system (GPS) receiver, an electronic estimating module, and an electronic output module are used. The accelerometers indicate the vehicle accelerations, including the gravity acceleration field, in the three principle aircraft body axes. A composite "specific force vector" is measured with the accelerometers at successive time intervals. Each interval provides one of the multiple vector measurements needed, and this imposes a solution time delay while all the measurements are gathered. Such multiple measurements are required to fully resolve attitude. A series of aircraft position changes along the three aircraft body axes caused by the measured accelerations, times a vector, approximately match a corresponding series of position changes along the earth-fixed axis as indicated by the GPS receiver. Trigonometry is used on the vector to indicate the pitch, roll, and heading of the aircraft.

Two-baseline GPS attitude determination systems use three antennas. The differential position of each antenna is computed from differential carrier-phase measurements. A prior art example of this is described by LaMar Timothy, et al., in U.S. Pat. No. 5,101,356, issued Mar. 31, 1992.

Roger Hayward, et al., all of Stanford University, published an article titled "Two Antenna GPS Attitude and Integer Ambiguity Resolution for Aircraft Applications," Proceedings of the 1999 Institute of Navigation (ION) Technical Meeting, January 1999, San Diego, Calif. Such article describes the attitude determination of a moving aircraft, starting with a priori attitude information, and then using the measurement of specific force in two frames. Roll and pitch are determined by incorporating the a priori information with the specific force measured in two reference frames.

SUMMARY OF THE INVENTION

It is therefore an object of the present invention to provide an attitude determination system that uses the specific force vector as one of two or more vectors collected to resolve the attitude of a moving vehicle.

It is a further object of the present invention to provide an attitude determination system that measures the specific force vector in the earth-fixed frame with a navigation satellite receiver.

Briefly, an attitude determination system embodiment of the present invention uses navigation satellite receiver measurements of the acceleration of a point on moving vehicle to derive valuable attitude information about the vehicle. This acceleration is added to the known gravity vector to form the specific force in the earth-fixed frame. Three-dimensional accelerometer measurements aboard the vehicle are used to determine the specific force vector in the body-fixed frame. Such specific force vector is simply combined with measurements of one or more additional vectors, e.g., antenna baselines, magnetic fields, etc. The attitude of the moving vehicle can then be determined with a conventional optimization algorithm.

An advantage of the present invention is that an attitude determination system is provided that provides accurate estimates of an aircraft's pitch, roll, and heading.

Another advantage of the present invention is that an attitude determination system is provided that uses standard GPS receiver output solutions.

A further advantage of the present invention is that an attitude determination system is provided that simultaneously solves for pitch, roll, and heading.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of an attitude determination system embodiment of the present invention; and FIG. 2 is a flowchart diagram of an attitude-determination method embodiment of the present invention that can be implemented with the hardware illustrated in FIG. 1.

DETAILED DESCRIPTION OF THE PREFERRED EMBODIMENT

An attitude determination system embodiment of the present invention is illustrated in FIG. 1 and is referred to herein by the general reference numeral 100. Such attitude determination system 100 is typically mounted to a moving vehicle such as an airplane. A specific force vector 102 is the vector sum of the translational acceleration and the gravitational acceleration of a point on a moving vehicle. Such specific force vector 102 is observable in a "B-frame" coordinate reference system for such moving vehicle and an "N-frame" coordinate reference system for earth. A three-dimensional accelerometer 104 provides a three-axis specific force signal 106 for the moving vehicle which is referenced to the B-frame. A navigation satellite receiver, such as a global positioning system (GPS) receiver 108 provides a navigation solution signal 110 that includes a position estimate of an antenna 112, a clock-calendar time, and a velocity estimate. Such navigation satellite receiver 108 could also be a GLONASS-type which is compatible with the Russian navigation satellite system. A plurality of orbiting navigation satellites, represented by a pair of satellites 114 and 116 provide microwave L-band signals to the navigation satellite receiver 108. The carrier signals of these satellites 114 and 116 are individually subject to Doppler shifts caused by the relative velocities of the satellites and the antenna 112 (and thus the whole of system 100).

A three-dimensional acceleration estimate for the moving vehicle which is referenced to the N-frame can be derived by filtering the position and the velocity estimates from the navigation satellite receiver 108 over time. A computer 118 calculates such three-dimensional acceleration estimate in the N-frame, and adds this to the known gravity vector in the N-frame to form the specific force in the N-frame. At least one additional vector 120 is input to the computer 118 before an attitude solution 122 can be output. The second vector 120 may be a heading signal provided by a fluxgate compass sensor or other conventional navigation device. The second vector 120 may also be a vector that was calculated or measured by outside means, such as a vector to the sun, a LORAN transmitter, a GPS satellite, a star, etc. The second vector 120 must, however, be known or measurable in both the B-frame and the N-frame.

Embodiments of the present invention resolve the attitude of a moving vehicle relative to the earth by observing two or more vectors that can both be measured in the vehicle frame and the earth frame. In particular, one of these vectors must be the specific force vector of the vehicle.

When the vehicle is at rest, the specific force vector will be that of gravity. The direction component will be to nadir. A simple bubble level and angle scale would be enough to determine the pitch and roll components of the attitude in the vehicle frame. But if the vehicle is moving, and in particular accelerating in any axis, then the apparent nadir will not be the true nadir. The acceleration forces of the moving vehicle will vector sum with the earth's gravitational field and produce a difference between the "specific force vector" and the "gravity vector" referred to herein.

Embodiments of the present invention therefore observe the specific force vector in both the vehicle frame-of-reference (B-frame) and the earth-fixed frame-of-reference (N-frame). The observation of the specific force vector in the vehicle frame-of-reference is made possible by fitting the moving vehicle with accelerometers, e.g., three one-axis types set orthogonally in the three cardinal axes. The direction component of the specific force vector, relative to the vehicle frame, is the important and necessary piece of information required.

The observation of the specific force vector of the moving vehicle in the earth-fixed frame-of-reference is made possible by a navigation satellite receiver, e.g., a GPS or GLONASS receiver that provides velocity solutions. The GPS solution of the specific force vector of the moving vehicle in the earth-fixed frame-of-reference can be used in a simultaneous equation with the accelerometer solution of the specific force vector of the moving vehicle in the vehicle frame-of-reference to find the pitch and roll of the vehicle frame relative to the earth frame, if a priori heading information or some other vector measured in the B and N frames is available.

Determining pitch, roll, and heading (yaw) requires that a second vector observable in both the vehicle frame and the earth frame be measured. The general direction-of-travel of the moving vehicle will be obtainable from the GPS receiver as the velocity solution. But how the longitudinal axis of the moving vehicle relates to the earth frame is what is of interest. For example, a cross-wind may require an aircraft to yaw or crab left or right in order to fly straight ahead. Any of a number of means can be used to obtain the second vector needed for the complete solution of attitude, e.g., direction of the sun, stars, earth magnetic field, a LORAN transmitter, etc. Such equipment is conventional and need not be explained further here.

Embodiments of the present invention therefore solve for all three attitude components: pitch, roll, and heading, simultaneously, in one step, taking in both the necessary input vectors at once. One such input vector measurement must be the specific force vector in both the vehicle-frame and earth-frame.

From basic kinematics, it is known that, $$\vec{a} = \vec{c} + \vec{\alpha} \times \vec{p} + \vec{\omega} \times \vec{\omega} \times \vec{p}, \tag{1}$$

where, $\vec{a}$ = the acceleration vector at the accelerometers, $\vec{c}$ = the acceleration vector at the GPS antenna, $\vec{\alpha}$ = the angular acceleration of the B-frame in the N-frame, $\vec{\omega}$ = the angular velocity of the B-frame in the N-frame, and $\vec{p}$ = the vector from the GPS antenna to the accelerometer.

Let a vector $\vec{v}^N$ indicate an expression of a general vector $\vec{v}$ in terms of three components, namely the dot product of the vector with each of three orthonormal unit vectors fixed in frame N ($\vec{n}_1$, $\vec{n}_2$, and $\vec{n}_3$):

$$\vec{v}^N = \begin{bmatrix} \vec{v} \cdot \vec{n}_1 \\ \vec{v} \cdot \vec{n}_2 \\ \vec{v} \cdot \vec{n}_3 \end{bmatrix}. \tag{2}$$

The specific force measured by a three-dimensional accelerometer fixed in B, $\vec{h}$, is the sum of translational and gravitational accelerations, $$\vec{h} = \vec{a} + \vec{g} \tag{3}$$

$$\vec{h} = \vec{c} + \vec{\alpha} \times \vec{p} + \vec{\omega} \times \vec{\omega} \times \vec{p} + \vec{g}, \tag{4}$$

where, $\vec{g}$ = the gravity acceleration vector.

Placing the vectors that are known in the B-frame on the left side of the equation, and vectors that are known in the N-frame to the right side of the equation yields, $$\vec{h} - \vec{\alpha} \times \vec{p} - \vec{\omega} \times \vec{\omega} \times \vec{p} = \vec{c} + \vec{g}. \tag{5}$$

For convenience, let $\vec{d} = \vec{h} - \vec{\alpha} \times \vec{p} - \vec{\omega} \times \vec{\omega} \times \vec{p}$, so $$\vec{d} = \vec{c} + \vec{g}. \tag{6}$$

The same vector expressed in two different reference frames can be related using a "direction cosine matrix" that can be written as a function of three unique parameters. For example, $$A^{NB} = \begin{bmatrix} \cos(\Psi)\cos(\Theta) & \cos(\Psi)\sin(\Theta)\sin(\Phi) - \cos(\Phi)\sin(\Psi) & \cos(\Psi)\sin(\Theta)\cos(\Phi) - \sin(\Phi)\sin(\Psi) \\ \sin(\Psi)\cos(\Theta) & \cos(\Psi)\sin(\Theta)\sin(\Phi) + \cos(\Phi)\cos(\Psi) & \sin(\Psi)\sin(\Theta)\cos(\Phi) + \sin(\Phi)\cos(\Psi) \\ -\sin(\Theta) & \cos(\Theta)\sin(\Phi) & \cos(\Theta)\cos(\Phi) \end{bmatrix} \quad (7)$$

such that, $$\vec{v}^N = A^{NB}(\Psi, \Theta, \Phi) \vec{v}^B, \quad (8)$$

where, $\Psi, \Theta, \Phi$ are known as the Euler angles "heading", "pitch", and "roll", respectively.

In general, a single vector measurement in both the B-frame and N-frame will not permit a solution of all three Euler angles. However, if one of the Eueler angles is known a priori, the other two can be determined with a single vector measurement in both the B-frame and N-frame. Of course if two vector measurements in both the B-frame and N-frame are available, then all three Euler angles can be determined, e.g., in a simple computer calculation.

Assuming that $\vec{d}$ is known in the B-frame, and $\vec{c}$ and $\vec{g}$ are both known in the N-frame, $$\vec{c}^N + \vec{g}^N = A^{NB}(\Psi, \Theta, \Phi) \vec{d}^B. \quad (9)$$

If there is an estimate of one of the three Euler angles, the other two may be found. For example, a measurement of the heading angle, $\Psi$, may be available from a magnetic compass sensor, a GPS receiver, or it may be a constraint, e.g., a train on a rail. Given $\Psi$, the pitch and roll can be computed knowing only the specific force vector in both the B-frame and N-frame.

In alternative embodiments of the present invention, a second GPS receiver antenna is used so that the vector direction of the baseline between antennas can be measured. Letting $\vec{b}$ represent the vector between the GPS antennas, $\vec{b}^B$ will be known. Carrier phase measurements taken in the two antennas and the almanac position of two transmitting GPS satellites allow for the baseline vector to be determined in the N-frame, $\vec{b}^N$. Thus $\vec{b}^N = A^{NB}(\Psi, \Theta, \Phi) \vec{b}^B$. Solving both these equations simultaneously using conventional optimization and estimation techniques allows the simultaneous calculation of all three Euler angles, i.e., the attitude of the B-frame with respect to the N-frame.

In general, at least two non-collinear vectors are required to determine the full attitude from vector measurements. Let the $i^{th}$ vector pair be denoted $\underline{v}_i^N$ and $\underline{v}_i^B$. If $\underline{v}_i^N$ and $\underline{v}_i^B$ are not known perfectly, then an optimal estimate of A can be found that minimizes the cost function, $$J = \sum_i |\underline{v}_i^B - A\underline{v}_i^N|^2. \quad (10)$$

The optimal A can be found by forming the matrix G as the sum of the outer products of the vectors, $$G = \sum_i \underline{v}_i^B \underline{v}_i^{NT}. \quad (11)$$

Then the optimal quaternion is the normalized eigenvector associated with the maximum eigenvalue of the matrix K, where, $$K = \begin{bmatrix} G + G^T - tr[G] & z \\ z^T & tr[G] \end{bmatrix} \quad (12)$$

and $$z = [G_{23} - G_{32} | G_{31} - G_{13} | G_{12} - G_{21}]^T \quad (13)$$

$$q = [q_1 q_2 q_3 q_4]^T = \max(\text{eigenvector}(K)). \quad (14)$$

To convert from a quaternion representation of attitude to Euler angles (heading, pitch, roll), the attitude matrix A is computed, $$A = \begin{bmatrix} q_1^2 + q_2^2 - q_3^2 - q_4^2 & 2(q_1 q_2 - q_3 q_4) & 2(q_1 q_3 + q_2 q_4) \\ 2(q_1 q_2 + q_3 q_4) & -q_1^2 + q_2^2 + q_3^2 + q_4^2 & 2(q_2 q_3 - q_1 q_4) \\ 2(q_1 q_3 - q_2 q_4) & 2(q_2 q_3 + q_1 q_4) & -q_1^2 - q_2^2 + q_3^2 + q_4^2 \end{bmatrix} \quad (15)$$

from which the three Euler angles can be computed. One such means of computation is as follows, $$\Psi = \arctan 2(A_{12}, A_{11})$$

$$\Phi = \arctan 2(A_{23}, A_{33})$$

$$\Theta = \arcsin(-A_{13})$$

if ($\Psi < 0$), then, $\Psi := \Psi + 2\pi$ \quad (16)

Pitch can also be written taking more of the elements of A into account and such could increase the estimate's accuracy.

Particular methods for computing the maximum eigenvector of matrix K are described by Daniele Mortari in, "ESOQ: A Closed-Form Solution to the Wahba Problem," Journal of the Astronautical Sciences, Vol. 45, No. 2, April–June 1997, pp. 195–204; and Gene H. Golub, et al., in *Matrix Computations*, Second Edition, Chapter 7, Johns Hopkins University Press, 1989.

The N-frame referenced specific force measurement can be alternatively obtained from GPS carrier-shift Doppler information, rather than by filtering the GPS-received position and velocity estimates. This may provide quicker estimates of the specific force in the N-frame. The GPS receiver 108 automatically tracks the carrier signals from satellites 114 and 116. Such tracking includes adjusting for Doppler shifts of the carrier signals. The exact carrier shifts can be electronically tapped into at points inside the GPS receiver 108. The exact positions and velocities of the satellites 114 and 116 are necessarily determined in the normal operation of the GPS receiver 108. And, the position solution of the GPS receiver 108 itself is a normal output. Therefore, it is a straightforward calculation to determine the translational accelerations of the system 100 directly from the Doppler shifts of the carrier signals. Such Doppler-shift calculated translational accelerations can be added to the earth's gravity acceleration to determine the specific force vector in the N-frame.

Given a Doppler measurement for a satellite i in a GPS receiver, $$d_i = \underline{s}_i^T(\underline{v}_i - \underline{v}_u) + \dot{f} + \epsilon_i, \quad (17)$$

where, $$\underline{a} = \frac{\partial \underline{v}}{\partial t}, \text{ and} \quad (18)$$

$d_i$=the measured Doppler (in meters/second),
$\underline{s}_i$=the line-of-sight vector from the user to satellite i,
$\underline{v}_i$=the velocity of satellite i in the earth-fixed frame (N),
$\underline{v}_u$=the velocity of the user in the earth-fixed frame (N),
$\dot{f}$=the user frequency offset (meters/second), and
$\epsilon_i$=any remaining measurement errors.

For simultaneous multiple satellite measurements, $$\underline{\dot{\delta}} = -S^T \underline{a}_u + \underline{1}\dot{f} + \underline{\epsilon}, \quad (19)$$

where, $\underline{1}$ is a vector of all ones and matrix S is a 3-by-N matrix. The columns of S are the unit line-of-sight vectors for each satellite in the combined measurement. The user Doppler-rate vector, $\underline{\dot{\delta}}$, is the measured Doppler rate, minus the known satellite acceleration for each satellite.

The measurement, $$\underline{\dot{\delta}} = \begin{bmatrix} \dot{d}_1 - \underline{s}_1^T \underline{a}_1 \\ \dot{d}_2 - \underline{s}_2^T \underline{a}_2 \\ \ldots \\ \dot{d}_n - \underline{s}_n^T \underline{a}_n \end{bmatrix}, \quad (20)$$

can be written as, $$\underline{\dot{\delta}} = H\underline{\dot{x}} + \underline{\epsilon}, \quad (21)$$

where, $$H = [-S^T \quad \underline{1}], \underline{x} = \begin{bmatrix} \underline{a}_u \\ \dot{f} \end{bmatrix}. \quad (22)$$

The least-square solution for x is then, $$\underline{\hat{x}} = (H^T H)^{-1} H^T \underline{\dot{\delta}}. \quad (23)$$

The user acceleration is the first three elements of the estimate vector, $\underline{\hat{x}}$. The only remaining job is the computation of $\underline{\dot{d}}_i$, which is not directly observable by the GPS receiver. However, since $d_i$ is directly observable, $\underline{\dot{d}}_i$ can be estimated by numerical differentiation.

FIG. 2 illustrates a method for determining the attitude of a moving vehicle relative to earth, and is referred to herein by the general reference numeral 200. The method 200 comprises a step 202 for measuring a first specific force vector of a moving vehicle with respect to a vehicle-fixed frame (B-frame). A step 204 is for deriving a second specific force vector of the moving vehicle with respect to an earth-fixed frame (N-frame). A step 206 inputs a heading estimate, e.g., signal 120 (FIG. 1). A step 208 simultaneously calculates a roll and a pitch estimate of the moving vehicle, given the heading estimate, the first specific force vector, and the second specific force vector. A step 210 outputs an estimate of the attitude of the moving vehicle with respect to the earth.

The step 202 of measuring the first specific force vector preferably includes the use of accelerometers mounted aboard the moving vehicle. The step 204 which derives the second specific force vector preferably includes the use of a navigation satellite receiver mounted aboard the moving vehicle. Such navigation satellite receiver provides navigation solutions of the velocity in the N-frame.

In alternative embodiments of the present invention, the step of deriving a second specific force vector includes the use of a navigation satellite receiver mounted aboard the moving vehicle which provides clock-calendar time which is used to time-match measurements of the first and second specific force vectors.

Still further alternative embodiments of the present invention use Doppler-shift measurements of the carrier signals of orbiting navigation satellites to determine the velocity of the moving vehicle in the earth-fixed frame.

In general, method embodiments of the present invention for determining the attitude of a moving vehicle relative to earth comprise: measuring a first specific force vector of a moving vehicle with respect to a vehicle-fixed frame (B-frame); deriving a second specific force vector of the moving vehicle with respect to an earth-fixed frame (N-frame); inputting an auxiliary vector that is known in both the vehicle-fixed frame and the earth-fixed frame; simultaneously calculating heading, pitch, and roll estimates of the moving vehicle from the auxiliary vector, the first specific force vector, and the second specific force vector; and outputting an attitude estimate that includes the heading, pitch, and roll estimates. The measuring of the first specific force vector typically includes the use of accelerometers mounted aboard the moving vehicle. The deriving of the second specific force vector always includes the use of a navigation satellite receiver mounted aboard the moving vehicle.

In alternative embodiments of the present invention, the satellite navigation receiver further provides clock and calendar time which is used to time-tag each of said first and second specific force vectors according to their respective times of calculation.

A method embodiment of the present invention for determining the attitude of a moving vehicle relative to earth starts by measuring a first specific force vector of a moving vehicle with respect to a vehicle-fixed frame (B-frame). Then it includes deriving a second specific force vector of the moving vehicle with respect to an earth-fixed frame (N-frame). A next step is for inputting an auxiliary vector that is known in both the vehicle-fixed frame and the earth-fixed frame, then simultaneously calculating an attitude of the moving vehicle from the auxiliary vector, the first specific force vector, and the second specific force vector. The method then outputs an attitude estimate that includes the heading, pitch, and roll estimates.

The step of measuring a first specific force vector can further include the use of accelerometers mounted aboard the moving vehicle, and the step of deriving a second specific force vector can further include the use of a navigation satellite receiver mounted aboard the moving vehicle, and which provides navigation solutions including velocity.

In an alternative method embodiment of the present invention, the step of deriving a second specific force vector further includes the use of a navigation satellite receiver mounted aboard the moving vehicle, which provides clock and calendar time to a computer. The step of simultaneously calculating heading, pitch, and roll estimates is, done with a computer, such that the clock and calendar time is used to time-match measurements of the first and second specific force vectors.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for determining the heading, pitch, and roll of a moving vehicle relative to the earth, comprising:
   a set of accelerometers carried aboard said moving vehicle for providing respective acceleration measurements for vehicle-frame x, y, z axes;
   a calculator for determining a first specific force vector relative to said vehicle-frame x, y, z axes from said respective acceleration measurements;
   a satellite navigation receiver for providing a second specific force vector; and
   a computer for estimating a heading, pitch, and roll of said moving vehicle relative to the earth by matching said first and second specific force vectors and solving for a vehicle-frame attitude relative to earth;
   wherein, a vehicle-frame attitude estimate is output.

2. The system of claim 1, wherein:
   the satellite navigation receiver is a global positioning system (GPS) type and is carried aboard said moving vehicle.

3. The system of claim 1, wherein:
   the satellite navigation: receiver further provides clock and calendar time which is used to time-tag each of said first and second specific force vectors according to their respective times of calculation.

4. The system of claim 1, wherein:
   the satellite navigation receiver further provides clock and calendar time which is used to correlate each of said first and second specific force vectors according to their respective times of calculation.

5. The system of claim 1, wherein:
   the computer estimates said heading, pitch, and roll of said moving vehicle relative to the earth on-the-fly and in realtime as said first and second specific force vectors become available.

6. The system of claim 1, wherein:
   the computer estimates past values of said heading, pitch, and roll of said moving vehicle relative to the earth during post-processing of stored values of said first and second specific force vectors.

7. The system of claim 1, wherein:
   the satellite navigation receiver includes only one antenna.

8. A system for determining the heading, pitch, and roll of a moving vehicle relative to the earth, comprising:
   a set of accelerometers carried aboard said moving vehicle for providing respective acceleration measurements for vehicle-frame x, y, z axes;
   a calculator for determining a first specific force vector relative to said vehicle-frame x, y, z axes from said respective acceleration measurements;
   a satellite navigation receiver for providing a second specific force vector; and
   a computer for estimating a heading, pitch, and roll of said moving vehicle relative to the earth by matching said first and second specific force vectors and solving for a vehicle-frame attitude relative to earth which is then output;
   wherein, the satellite navigation receiver provides said second specific force vectors by differential measurements of a series of positions over time.

9. A system for determining the heading, pitch, and roll of a moving vehicle relative to the earth, comprising:
   a set of accelerometers carried aboard said moving vehicle for providing respective acceleration measurements for vehicle-frame x, y, z axes;
   a calculator for determining a first specific force vector relative to said vehicle-frame x, y, z axes from said respective acceleration measurements;
   a satellite navigation receiver for providing a second specific force vector; and
   a computer for estimating a heading, pitch, and roll of said moving vehicle relative to the earth by matching said first and second specific force vectors and solving for a vehicle-frame attitude relative to earth which is then output;
   wherein, the satellite navigation receiver provides said second specific force vectors derived directly from Doppler carrier-shift measurements of signals received from orbiting navigation satellite transmitters.

10. A method for determining the attitude of a moving vehicle relative to earth, the method comprising the steps of:
    measuring a first specific force vector of said moving vehicle with respect to a vehicle-fixed frame (B-frame);
    deriving a second specific force vector of vehicle with respect to an earth-fixed frame (N-frame );
    inputting an auxiliary vector that is known in both said vehicle-fixed frame and said earth-fixed frame;
    simultaneously calculating an attitude of said moving vehicle from said auxiliary vector, said first specific force vector, and said second specific force vector; and
    outputting an attitude estimate that includes said heading, pitch, and roll estimates.

11. The method of claim 10, wherein:
    the step of measuring a first specific force vector includes the use of accelerometers amounted aboard said moving vehicle; and
    the step of deriving a second specific force vector includes the use of a navigation satellite receiver mounted aboard said moving vehicle, and which provides navigation solutions including velocity.

12. The method of claim 11, further comprising the step of:
    making Doppler-shift measurements of the carrier signals of orbiting navigation satellites to determine a velocity of said moving vehicle in said earth-fixed frame, and using such to derive a measurement of said second specific force.

13. The method of claim 10, wherein:
    the step of deriving a second specific force vector includes the use of a navigation satellite receiver mounted a board said moving vehicle, and which provides clock-calendar time to a computer; and
    the step of simultaneously calculating heading, pitch, and roll estimates is done with a computer, wherein said clock-calendar time is used to time-match measurements of said first and second specific force vectors.

* * * * *